United States Patent [19]
Harrison

[11] Patent Number: 5,636,385
[45] Date of Patent: Jun. 10, 1997

[54] CLOTHING ARTICLE WITH FRAMED HOLOGRAM APPLIQUE

[76] Inventor: Don Harrison, 2929 Buffalo Sdwy., Houston, Tex. 77027

[21] Appl. No.: 568,307

[22] Filed: Dec. 6, 1995

[51] Int. Cl.⁶ .......................... A41D 27/00; A41D 27/08
[52] U.S. Cl. ...................... 2/244; 2/115; 2/69; 40/586; 428/79
[58] Field of Search .................. 2/46, 48, 49.1, 2/49.2, 49.3, 49.4, 49.5, 50, 51, 52, 75, 80, 83, 69, 69.5, 115, 244; 40/586, 636, 725, 768; 428/79, 914

[56] References Cited

U.S. PATENT DOCUMENTS

| | | | |
|---|---|---|---|
| 1,040,320 | 10/1912 | Heller | 40/725 |
| 1,897,341 | 2/1933 | Staufert | 40/725 X |
| 2,710,046 | 6/1955 | Markus et al. | 428/79 |
| 2,726,941 | 12/1955 | Markus et al. | 428/79 X |
| 2,729,009 | 1/1956 | Markus et al. | 428/79 X |
| 2,729,010 | 1/1956 | Markus et al. | 428/79 X |
| 2,926,439 | 3/1960 | Holick | 40/1.5 |
| 3,055,133 | 9/1962 | Anderson | 40/129 |
| 3,705,935 | 12/1972 | Francis et al. | 264/257 |
| 3,890,679 | 6/1975 | Simon | 24/213 |
| 4,264,386 | 4/1981 | Sears, Jr. et al. | 156/79 |
| 4,292,263 | 9/1981 | Hanrahan et al. | 264/46.9 |
| 4,581,271 | 4/1986 | Gordon | 40/586 |
| 4,585,684 | 4/1986 | Mackarous | 428/79 |
| 4,631,210 | 12/1986 | McGee et al. | 428/79 X |
| 4,645,629 | 2/1987 | Stern | 264/23 |
| 4,710,145 | 12/1987 | Hall Vandis | 446/100 |
| 4,810,559 | 3/1989 | Fortier et al. | 428/161 |
| 4,815,149 | 3/1989 | Erhardt et al. | 2/243 B |
| 4,837,864 | 6/1989 | Thill | 2/244 |
| 4,838,965 | 6/1989 | Bussard | 156/83 |
| 4,923,848 | 5/1990 | Akada et al. | 503/227 |
| 4,956,040 | 9/1990 | Fry | 156/267 |
| 5,005,219 | 4/1991 | Diaz | 2/244 |
| 5,048,123 | 9/1991 | Monson | 2/69 |
| 5,073,222 | 12/1991 | Fry | 156/267 |
| 5,079,778 | 1/1992 | Sloot | 2/244 X |
| 5,093,067 | 3/1992 | Gibson | 264/257 |
| 5,173,968 | 12/1992 | Fox | 2/244 |
| 5,241,919 | 9/1993 | Lagreca | 112/410 |
| 5,251,337 | 10/1993 | Sloot | 2/115 X |
| 5,281,499 | 1/1994 | Bussard | 430/1 |
| 5,314,767 | 5/1994 | Bussard | 430/1 |
| 5,398,345 | 3/1995 | Kenneth | 2/247 |

*Primary Examiner*—Jeanette E. Chapman
*Attorney, Agent, or Firm*—Pravel, Hewitt, Kimball & Krieger

[57] ABSTRACT

A clothing article in the form of a T-shirt, sweat shirt, or the like allows a hologram sheet design to be displayed through the window of a flexible frame member. The hologram sheet is in the form of a flat layer having an inner surface that faces the clothing article and a hologram three dimensional artistic surface facing away from the clothing article, the hologram surface displaying the three dimensional holographic art image outwardly to viewers. The flexible frame member is layered on top of the hologram layer, providing a peripheral welt that can be used to stitch the combination of the hologram sheet layer and flexible frame member to the clothing article. The flexible frame member is preferably of a polymeric material such as PVC providing a base layer having a window opening in its center for displaying the holographic art image therethrough. The outer surface of the base layer of the frame member includes a plurality of spaced apart raised three dimensional portions that define separate elements of an overall artistic visual design.

12 Claims, 2 Drawing Sheets

CLOTHING ARTICLE WITH FRAMED HOLOGRAM APPLIQUE

BACKGROUND OF THE INVENTION

1. Field of the Invention

The present invention relates to clothing articles, textile articles and the like and more particularly relates to an improved clothing article that includes an applique that is comprised of a hologram that is framed by a frame member having a central window for displaying the hologram and a peripheral portion with a welt for attaching the combination of the frame member and a hologram sheet layer to the clothing article, textile article or the like. Even more particularly, the present invention relates to clothing articles such as T-shirts, hats, sweat shirts, and like textile products having an applique that includes a frame member having three dimensional graphics and a central window through which a hologram can be displayed so that the user simultaneously displays the hologram and the three dimensional graphics carried by the frame member.

2. General Background

T-shirts, sweat shirts, jackets and the like are frequently sold with an applique that is stitched thereto. In the past, these appliques have taken the form of layers of cloth such as felt, wool, and the like. The problem with such layers of clothing is that they quickly lose color, shape, and definition.

An example of an early patent that discusses the attachment of insignia or appliques to clothing is the Holick U.S. Pat. No. 2,926,439 entitled "LAUNDRY PROOF PLASTIC INSIGNIA AND NAME PLATE HOLDER-COVER".

The application of pictures to a garment is discussed in U.S. Pat. No. 3,055,133 entitled "JACKET WITH PICTURE POCKETS" issued to Kenneth Anderson. The Anderson patent discloses a vest like jacket having rectangular pockets that are clear so that when photographs are placed in a pocket, they can be seen through the clear plastic material. The clear pockets are formed by a plastic material sewed upon the jacket and divided into individual pockets by cross-sewing.

A doll figure that has appliques is disclosed in the Vandis U.S. Pat. No. 4,710,145.

The Erhardt et al. U.S. Pat. No. 4,815,149 entitled "FABRIC CLOTHING INCLUDING A THREE DIMENSIONAL PATTERN" shows an article of apparel such as a T-shirt that includes multiple fabric layers. The T-shirts includes a fabric layer upon which is attached a three dimensional molded article providing a three dimensional relief pattern on the front part of the T-shirt. The three dimensional molded part includes a flat base disk and raised relief parts with the disk being attached to the T-shirt fabric leaving a hollow area in between the fabric and the raised parts.

An article of clothing to which a three dimensional applique has been applied to provide a decorative effect is disclosed in U.S. Pat. Pat. No. 4,837,864 issued to Thill. The Thill patent provides an applique that is of a flexible non-cloth material such as vinyl, various plastics or rubber which is attached to the front of panel of a T-shirt or sweater. The attachment is accomplished either through sewing or other positive connectors. The three dimensional applique is formed through various molding processes and the shirt or sweater may be cut to receive same.

The Akada et al. U.S. Pat. No. 4,923,848 relates to image formation on any selected kind of objective body. The objective body is discussed as being cards, clothes, papers, and transparent sheets. An example of a garment having a decorative applique is seen in the Diaz U.S. Pat. No. 5,005,219. An image is manufactured directly on a garment, such as by silkscreening. Chenille is sewn about the border of the image, thereby creating a shape with a chenille outline and an interior image. The decorative shapes are said to be letters, numbers, mascots, characters or symbols.

Another patent that discusses the application of an applique to clothing is the LaGreca U.S. Pat. No. 5,241,919. In the LeGreca patent there is disclosed an applique design produced on a garment or other fabric article by providing a chenille material having a fabric base and a plurality of cut or looped threads extending from an upper surface of a fabric base and applying a flexible backing material to a lower surface of the chenille material. The chenille material is cut to form edges having an outline of a desired design and disposed over a garment or fabric base. A polymer film is overlaid on the upper surface of the chenille material and a design is stitched over the film to the chenille material and a garment or fabric base. The stitching comprises closely spaced thread which covers and compresses portions of the film and chenille material. The film provides a barrier layer to prevent the thread loops from extending between the closely spaced thread of the stitching. The film is removed from the unstitched portions of the upper surface of the chenille material whereby the desired design is formed by the stitched and unstitched portions of the chenille material.

Hologram designs have been placed on T-shirts and like articles of clothing for displaying the vivid image that accompanies these types of artistic designs.

An example of a recent patent that relates to the display of holographic art on a T-shirt or other textile product is U.S. Pat. No. 4,838,965 issued to Janice Bussard and entitled "HOLOGRAPHIC ART APPLIED TO T-SHIRTS OR OTHER TEXTILE PRODUCTS". The Bussard '965 patent discloses a hologram being adhered to a textile fabric by means of a silk screen printing ink while at the same time printing a graphic on the textile; the ink embedding the hologram edges therein and the ink containing an ingredient to bond with the hologram.

U.S. Pat. No. 5,281,499, also issued to Bussard, entitled "MOISTURE AND ABRASION RESISTANT HOLOGRAPHIC PRODUCTS", discloses a product and process comprising a layered hologram and diffraction grating which will resist deterioration from abrasion and moisture as a separate article of commerce or when attached to a substrate (especially fabrics). Such resistance is accomplished by sealing the edges of the layered product and thereby protecting the embossed surface that produces the hologram image or the iridescent diffraction grating pattern. When attached to a substrate by a moisture impermeable adhesive, detachment from the substrate is also inhibited. The combination of holographic art with a printed graphic is thereby perfected.

Another Bussard patent that relates to holographic products is U.S. Pat. No. 5,314,767 entitled "HOLOGRAPHIC PRODUCTS WITH IMPROVED SEALS". The '767 patent discloses an improved process for cutting and simultaneously sealing the cut edges of holographic materials comprising cutting with a hot cutting tool. Suitable cutting tools include a steel rule die, a hot tipped cutter, and a laser. The resulting product can be attached easily to a substrate and will resist delaminations even when attached to a substrate such as a textile material that will be subjected to ordinary washing and drying.

The Fry U.S. Pat. Nos. 4,956,040 and 5,073,222 relate to methods of adhering holograms to textile wearing apparel.

Each of these patents discloses a method for adhering holograms to textile wearing apparel involving the steps of laminating a precut hologram between a clear polyester coating and an adhesive scrim backing to envelop the hologram and protect it from moisture and scuffing, cutting margins away from the laminated hologram to form an enveloped hologram and applying the enveloped hologram to wearing apparel at a temperature of between approximately two hundred seventy degrees and three hundred degrees Fahrenheit (270°–F.300° F.) under a pressure of approximately thirty to fifty (30 to 50) psi for a period of approximately eight to fifteen (8 to 15) seconds. A hologram becomes firmly adhered to the wearing apparel and remains impervious to moisture after repeated machine washing and drying cycles.

Recent patents that disclose the concept of an aperture garment having an envelope structure or pocket for displaying an article are the Fox U.S. Pat. No. 5,173,968 and the Kenneth et al. U.S. Pat. No. 5,398,345. The Fox '968 patent discloses an article constituted of pieces of self-adhesive pliable plastic which form a well sealed enveloping structure with may be manually unsealed and opened for the insertion of decorative or information conveying material and then manually closed again and well re-sealed at least one piece of plastic being transparent then at least one piece being selected so as to permit viewing of decorative information conveying material in the enveloping structure.

The Kenneth '345 patent discloses a combination aperture garment product and object adapted for securement in the pocket, where the pocket is attached to the garment by seams and has apertures therein. The object, which may be a teddy bear having appendages, is adapted to be removably secured in the pocket so that the appendages extend outside of the pocket through the apertures and are visible when positioned in the pocket. The apertures are arranged through the pocket panel spaced apart from the seams. The garment may have two dimensional graphic indicia arranged on it and the three dimensional object, when secured in the pocket, forms a part of the graphic indicia.

None of these prior art articles discloses a hologram and graphics display wherein a frame member has a central window for displaying an underlying hologram, and wherein improved three dimensional layered graphics form the frame.

SUMMARY OF THE INVENTION

The present invention provides an improved clothing article that allows the user to wear a very decorative multi-colored design that includes both a peripheral flexible frame member and a central window through which a hologram can be displayed. This construction provides an extremely artistic multi-colored applique because the user sees both the hologram and a multi-colored three dimensional frame member that extends thereabout.

The present invention thus provides a textile article of clothing to be worn by the user, the article of clothing providing an outer surface to which an applique can be attached, such as by sewing, gluing, or the like.

The hologram sheet of material forms an innermost layer. The hologram layer has an inner surface that faces the clothing article and a hologram surface facing away from the clothing article for display. The hologram surface includes a three dimensional holographic art image.

A flexible frame member is layered on top of the hologram sheet layer. The flexible frame member has a periphery, an inner surface that faces the clothing article and underlying hologram sheet layer, and an outer surface that faces away from the clothing article. A window opening is formed at the center of the frame member for displaying part of the underlying holographic art image.

The outer surface of the frame member has a plurality of separate, spaced raised portions that define an overall three dimensional artistic visual design. The periphery of the frame member surrounds the hologram surface and the window.

In the preferred embodiment, a welt is provided at the periphery of the frame member for accepting stitching that secures the combination of frame and hologram to the clothing article.

In the preferred embodiment, the flexible frame member is of a polymeric material. The flexible frame member can be of a rubber material. The preferred material for the flexible frame member is polyvinyl chloride (PVC).

The frame member can include a first flat layer that communicates with the periphery of the frame member. The first flat base layer is preferably of a uniform thickness and extending over the entire area of the frame member. To this first flat layer or base layer, a number of three dimensional items can be attached. These three dimensional items can include, for example, letters, numbers, annular rib portions, logo designs, flag designs, and the like.

Each of the three dimensional indicia that are applied to the base layer can be colored differently. For example, an artistic logo can be in the form of a flag such as the American flag having red, white and blue separate coloration. Similarly, three dimensional letters can be applied to the base layer, each letter being of a desired color.

The logo designs can be formed of differing shapes and differing colors such as for example the different shapes that would comprise the American flag, including elongated strips or elongated rectangles for the red and white stripes of the flag and a blue rectangular portion for that part of the flag that carries the stars.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
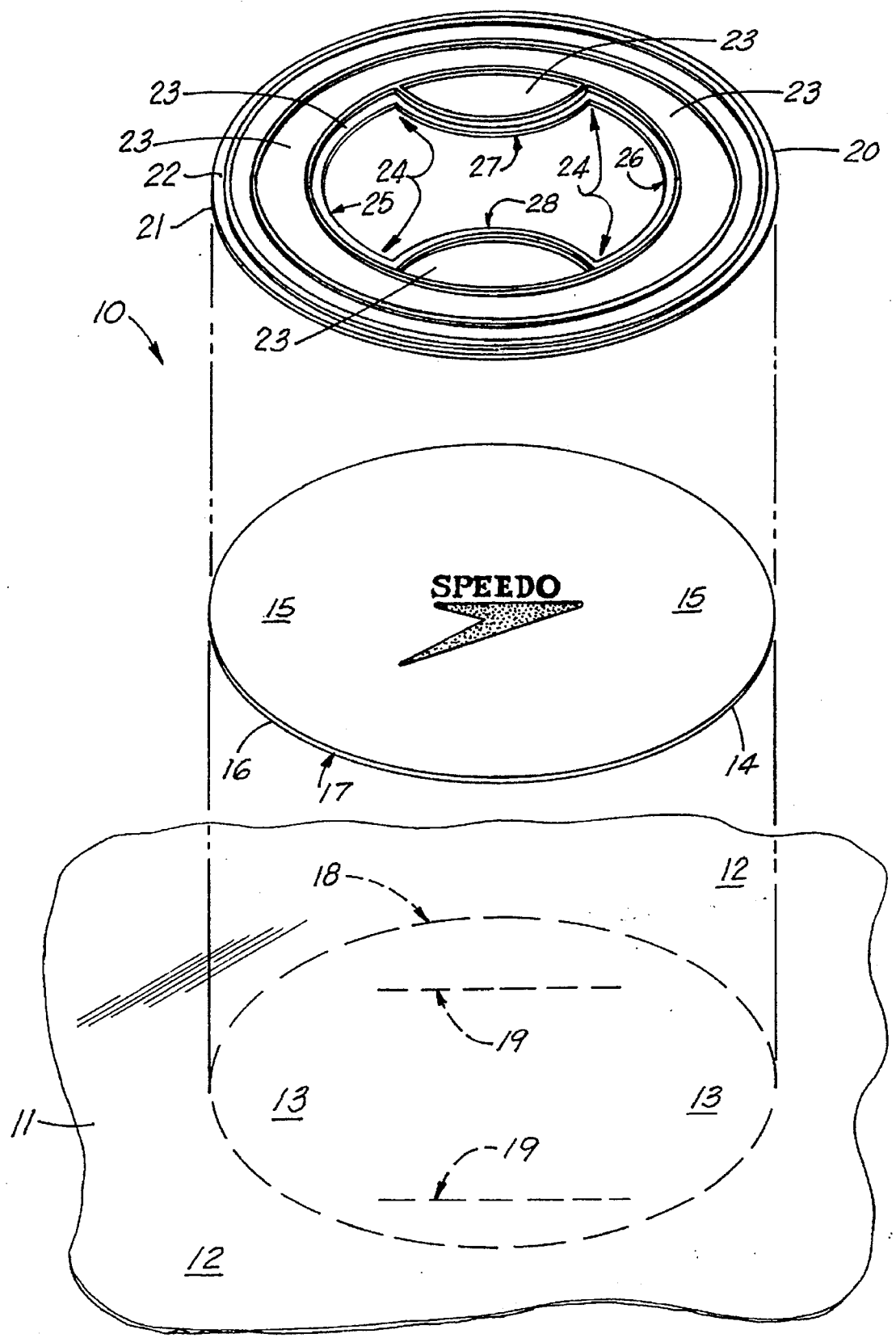
FIG. 1 is a perspective exploded view of the preferred embodiment of the apparatus of the present invention.
Figure 2:
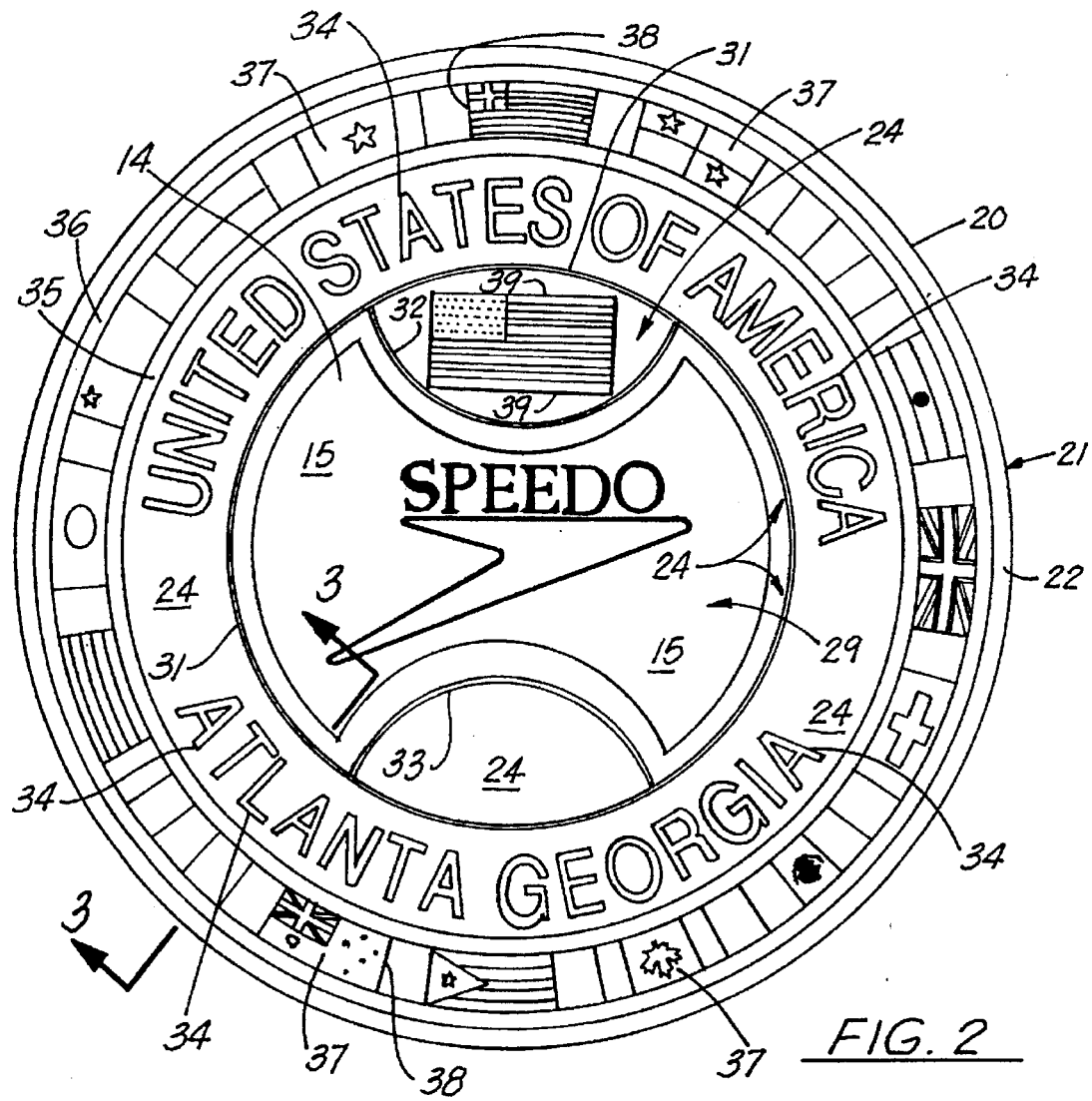
FIG. 2 is a top view of the preferred embodiment of the apparatus of the present invention.
Figure 3:
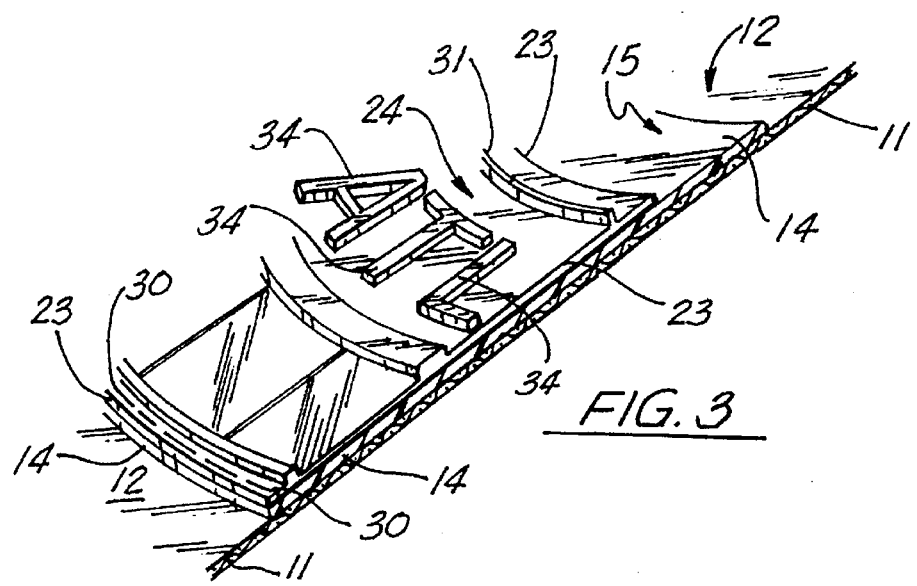
FIG. 3 is a sectional view taken along lines 3—3 of FIG. 1.

FIGS. 1–3 shows the preferred embodiment of the apparatus of the present invention, designated generally by the numeral 10 in FIG. 1. Clothing article 10 includes a garment (T-shirt, sweatshirt, jacket, etc.) 11 having an outer surface 12 to which an applique can be attached. In FIG. 1, an attachment area is designated as 13 for receiving hologram sheet 14 and frame member 20. The dotted line 18 in FIG. 1 designates the area 13 of attachment for both hologram sheet layer 14 and frame member 13.

Hologram sheet 14 has an upper surface 15, a periphery 16, and a lower surface 17. The upper surface 15 provides a three dimensional holographic art image for display. The holographic art image is to be displayed through the central window 24 of frame member 20.

During installation, hologram sheet 14 is first attached to clothing article 11 at the attachment area 13. This can be accomplished using a pair of spaced apart stitched portions 19 that preliminarily attach hologram sheet 14 to garment 11 at attachment area 13. Once the hologram sheet 14 is attached to clothing article 11 using stitched portions 19, the frame 20 can be attached as well.

Frame member 20 provides a periphery 21 having a welt 22 that allows the frame member 20 to be sewn to the clothing article 11. In the preferred embodiment, the outer configuration of hologram sheet 14 and frame member 20 are the same so that when the user aligns the hologram sheet 14 and the frame member 20 to the dotted line 18 in FIG. 1, a stitched attachment 30 can be used to simultaneously attach the hologram sheet 14 and frame member 20 to the clothing article 11.

Frame member 20 is shown in detail in FIGS. 2 and 3. The frame member 20 includes a periphery 21 at welt 22. The welt 22 forms part of a base layer 23 that is preferably of a uniform thickness and which extends over the entire area of frame member 20. The base layer 23 can for example, be about 1–2 millimeters in thickness, providing a rugged yet flexible base to which three dimensional indicia can be attached. In the embodiment of FIGS. 1–3, the base layer 23 has a central opening or window 24 bordered by arc-shaped edges 25–28. The arc-shaped edges 25–26 are concavely shaped. The arc-shaped edges 27–28 are convexly shaped.

Different types of three dimensional indicia are shown in various forms in the embodiment of FIGS. 1–3. These include raised ribbed portions, raised letters or numbers, and raised logo designs. The raised ribbed portions include an elongated circular rib 32, a pair of arc-shaped ribs 32, 33, and a pair of larger, thicker elongated circular ribs 35, 36.

The first rib 31 is of a smaller thickness, extending about the window 24 as shown in FIGS. 1 and 2. The elongated circular ribs 35 and 36 provide larger diameter circular portions, each of the ribs 35, 36 being much thicker than the rib 31 as shown.

Raised indicia 34 include a number of three dimensional letters placed at spaced apart locations over the surface 24 of base layer 23. These three dimensional raised indicia 34 can be of any desired letter or number and of any desired color. A number of raised logo designs 37, 39 are shown. These designs 37, 39 include, as an example, the American flag 39 and the flags 37 of various other nations. These raised logo designs are three dimensional, being applied to the upper surface 24 of base layer 23.

In the embodiment of FIGS. 1 and 3, the various raised logo designs 37 in the form of flags of other nations are placed in between the larger elongated circular ribs 35, 36. In the embodiment shown, radial grooves 38 can be used to separate these raised artistic logo designs 37.

The American flag design, indicated as raised section 39 is positioned in between the raised ribs 31 and 32. Another artistic design such as for example an artistic logo could be placed on surface 34 in between the arc-shaped rib 33 and circular rib 31. Such a logo design could be in the form a three dimensional artistic logo of a team sponsor, that might accompany the Olympic type artistic design shown in FIG. 2. The present invention thus allows a striking artistic display in the form of a combination of a hologram and a three dimensional frame that allows precise yet separate placement of well defined three dimensional graphical elements of differing color such as letters, numbers, ribs, stripping and/or logos.

The following table lists the parts numbers and parts descriptions as used herein and in the drawings attached hereto.

| PARTS LIST | |
| --- | --- |
| Part Number | Description |
| 10 | clothing article |
| 11 | garment |
| 12 | outer surface |
| 13 | attachment area |
| 14 | hologram sheet |
| 15 | upper surface |
| 16 | periphery |
| 17 | lower surface |
| 18 | dotted line |
| 19 | dotted line |
| 20 | frame member |
| 21 | periphery |
| 22 | welt |
| 23 | base layer |
| 24 | upper surface |
| 25 | arc-shaped edge |
| 26 | arc-shaped edge |
| 27 | arc-shaped edge |
| 28 | arc-shaped edge |
| 29 | window |
| 30 | stitching |
| 31 | elongated circular rib |
| 32 | arc-shaped rib |
| 33 | arc-shaped rib |
| 34 | raised indicia |
| 35 | elongated circular rib |
| 36 | elongated circular rib |
| 37 | raised section |
| 38 | radial groove |
| 39 | raised section |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A clothing article comprising:
   a) a textile article of clothing to be worn by a user, the article of clothing providing an outer surface;
   b) a hologram layer having an inner surface that faces the clothing article and a hologram surface facing away from the clothing article, the hologram surface displaying a three dimensional holographic art image;
   c) a flexible frame member layered on top of the hologram layer, said flexible frame member having a periphery, an inner surface that faces the clothing article, an outer surface that faces away from the clothing article;
   d) a window opening in the frame member for displaying the holographic art image; and
   e) the outer surface of the frame member having a plurality of separate, spaced apart raised portions that define separated elements of an overall artistic visual design, the periphery of the frame member surrounding the hologram surface.

2. The clothing article of claim 1 wherein the flexible frame member has a thickness of between about 2 and 4 mm.

3. The clothing article of claim 1 further comprising a welt at the frame member periphery for accepting stitching that secures the combination of the frame and hologram the clothing article.

4. The clothing article of claim 1 wherein the hologram layer has a thickness of about 1–2 millimeters.

5. The clothing article of claim 1 wherein the flexible frame member is rubber.

6. The clothing article of claim 1 wherein the flexible frame member is polymeric.

7. The clothing article of claim 1 wherein the flexible frame member is comprised of a pair of layers including a first flat layer and a second layer that is positioned at spaced apart locations over the first layer.

8. The clothing article of claim 7 wherein the first flat layer has a periphery that extends to the periphery of the flexible frame member and the second layer includes portions that are spaced inwardly of the periphery of the first flat layer.

9. The clothing article of claim 8 wherein the periphery of the first flat layer defines a welt at the frame member periphery for accepting stitching that secures the combination of the frame and hologram to the clothing article.

10. The clothing article of claim 1 wherein the raised portion of the frame member includes printed matter.

11. The clothing article of claim 1 wherein the raised portion of the frame member includes artistic graphics.

12. A clothing article comprising:
  a) a fabric article of clothing to be worn by a user, the article of clothing providing an outer surface;
  b) a hologram layer having an inner surface that faces the clothing article and a hologram surface facing away from the clothing article, the hologram surface displaying a three dimensional holographic art image;
  c) a flexible frame member layered on top of the hologram layer, said flexible frame member having a periphery, an inner surface that faces the clothing article, an outer surface that faces away from the clothing article;
  d) a window opening in the frame member for displaying the holographic art image; and
  e) the outer surface having raised portions that defines artistic visual matter and printed matter with a written message, the periphery of the frame member surrounding the hologram surface.

* * * * *